United States Patent
Chang

(10) Patent No.: US 6,963,404 B2
(45) Date of Patent: Nov. 8, 2005

(54) FABRY-PEROT DEVICE COMPENSATING FOR AN ERROR OF FULL WIDTH AT HALF MAXIMUM AND METHOD OF MAKING THE SAME

(75) Inventor: Sean Chang, Taoyuan (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 180 days.

(21) Appl. No.: 10/391,083

(22) Filed: Mar. 17, 2003

(65) Prior Publication Data

US 2004/0075845 A1    Apr. 22, 2004

(30) Foreign Application Priority Data

Oct. 16, 2002    (TW) .............................. 91123887 A

(51) Int. Cl.[7] .............................................. G01B 9/02
(52) U.S. Cl. ...................................... 356/454; 356/519
(58) Field of Search ................................ 356/480, 519, 356/454

(56) References Cited

U.S. PATENT DOCUMENTS 5,321,539 A * 6/1994 Hirabayashi et al. ....... 349/198

* cited by examiner

Primary Examiner—Hwa (Andrew) Lee
(74) Attorney, Agent, or Firm—Birch, Stewart, Kolasch & Birch, LLP

(57) ABSTRACT

The present invention discloses a Fabry-Perot device compensating for an error of full-width-at-half-maximum (FWHM) and a manufacturing method for the device. The Fabry-Perot device mainly consisted of a Fabry-Perot resonant cavity for a light to pass through. The cavity includes a first reflecting surface with a first reflectance for partly reflecting the light, and a second reflecting surface with a second reflectance for partly reflecting the light. In addition, a distance between the first and second reflecting surfaces may be adjusted according to the first and second reflectance, and thereby compensating for the error of FWHM caused by the first and second reflectance.

14 Claims, 3 Drawing Sheets

FABRY-PEROT DEVICE COMPENSATING FOR AN ERROR OF FULL WIDTH AT HALF MAXIMUM AND METHOD OF MAKING THE SAME

BACKGROUND OF THE INVENTION

1. Field of the Invention

The invention relates to a Fabry-Perot device, and more particularly, to a Fabry-Perot device capable of compensating for an error of full width at half maximum (FWHM) in fiber optical communication applications and the manufacturing method thereof.

2. Description of the Related Art

During the recent years, the characteristics namely reflection, refraction, interference, and fast transmission rate of light waves, have flourished various optical application techniques. And among them all, the development of optical communication surpasses the rest. Because the optical communication uses the traveling of light waves to transmit data, it is without doubt that the transmission and reception efficiency depends largely on the characteristics of light waves during the data transmission. In other words, to achieve the expected transmission and reception efficiency, these various active or passive optical devices being used in the current optical communication network must overcome restrictions set by the characteristics of light waves.

To satisfy such requirement, the manufacturing precision of existing optical devices without exception are manufactured by sub-micron, or even nanometer manufacturing techniques like semiconductor and micro-electro-mechanical systems (MEMS) manufacturing techniques. Take Fabry-Perot resonant cavities (or interferometers) for instance, they are developed by semiconductor techniques and the surface micro-machining techniques, and are also being extensively applied in the fields of optoelectronics, mechanics, biomedical as well as environmental detections.

FIG. 1 is a schematic diagram showing a prior Fabry-Perot Etalon. Referring to FIG. 1, a Fabry-Perot Etalon 10 includes two parallel planar mirrors 11 and 12 having reflectance R. Both the planar mirrors 11 and 12 are able to partly reflect an incident light 13, and a distance $D_{op}$ between them is defined as the optical thickness. When an incident light with wavelengths $\lambda_1 \sim \lambda_n$ enters the Fabry-Perot Etalon 10, the incident light goes back and forth between the planar mirrors 11 and 12 due to the reflection effect of the incident light 13 on the planar mirrors 11 and 12; and only the outgoing light 14 with wavelength $\lambda_i$ may pass through under the adjustment of the distance $D_{op}$ between the planar mirrors 11 and 12, thereby achieving a filtering effect. The optical properties of a Fabry-Perot device are defined by the following equations:

Free spectrum ratio, $FSR = (\lambda^2)/2n\, D_{op}$;

where $\lambda$ is the center wavelength, n is the optical index, and $D_{op}$ is the distance between the two planar mirrors;

Finesse, $F = \pi\sqrt{R}/1-R$;

where R is the reflectance of the two planar mirrors; and $FWHM = FSR/F$.

For the reason that the wavelength distribution of the outgoing light 14 passed through the Fabry-Perot Etalon 10 is almost a Gaussian distribution, a designer consequently takes the FWHM value of a filtered light wave as the prime design parameter in the application of common optical communication systems. With respect to the Fabry-Perot Etalon 10 mentioned above, the reflectance of the two planar mirrors 11 and 12 along with the optical thickness $D_{op}$ dominate the FWHM value of the wavelength distribution of the outgoing light 14. Therefore, it is the designer's primary task to control the optical thickness $D_{op}$ between the two planar mirrors and the reflectance R in manufacturing and configuring the two planar mirrors 11 and 12.

For example, the spectrum characteristics of the outgoing light 14 need to be satisfied with the condition of a FWHM being 0.37 nm and a free spectrum ratio (FSR) being at least 40 nm in order that the particular wavelength $\lambda_i$ of the outgoing light 14 passed through the aforesaid Fabry-Perot 10 equals to a center wavelength $\lambda$, that is, 1550 nm, of the C band within the wavelength range 1530 nm ~1565 nm, according to the ITU GRID 100 GHZ specifications in fiber optical communication. In this case, the finesse F has to be 108. FIG. 2 shows the definitions for the FWHM, the FSR and the finesse in this case. Furthermore, it is calculated that the optical thickness $D_{op}$ between the planar mirrors 11 and 12 turns out to be 30 $\mu$m at most according to the relationship between the FSR, the center wavelength $\lambda$, the optical thickness $D_{op}$ and the medium reflectance n ($FSR = \lambda^2/2nD_{op}$). It is also calculated that the reflectance R of the two planar reflecting mirrors 11 and 12 turns out to be 0.97 at least according to the relationship between the finesse F and the reflectance R of the two planar mirrors, that is, $F = \pi\sqrt{R}/1-R$.

Nevertheless, referring to FIG. 3, considering a prior Fabry-Perot 20 resonant cavity manufactured by current MEMS and semiconductor manufacturing techniques, it is common to etch a flute of a particular depth on a glass substrate 21, on which a fixed reflecting surface 23 is formed by coating a layer of optical thin film, and a mobile reflecting surface 24 coated with an optical thin film is formed on a silicon substrate 22 by using MEMS manufacturing techniques. In addition, the distance d in which the mobile reflecting surface is capable of moving is comparatively small than the distance D between the two reflecting surfaces, that is d<<D. With respect to the above, the reflectance of the two reflecting mirrors 23 and 24 is actually decided by the quality of the optical coatings, and the mature optical coating techniques in current use are merely capable of controlling the reflectance tolerance of the two reflecting surfaces within ±1%. Hence, in the above example, the reflectance of the optical coatings reaches practically 0.97±0.01, that is, 0.96~0.98. The finesse F, 77~155, and the FWHM value, 0552~0.258 nm are obtained by substituting the reflectance R, 0.96~0.98, into the finesse equation ($F = \pi\sqrt{R}/1-R$) and the FWHM equation (FWHM=FSR/F). However, such FWHM tolerance is too large and almost inapplicable. Thus, the actual FWHM value largely disagrees with the expected value due to the practical tolerance of the optical coatings for the prior Fabry-Perot resonant cavity 20. Therefore, the distance D between the two reflecting surfaces shall be adjusted for compensation so that the FWHM matches with the designer's expected value. Take FWHM being 0.37 nm for example, we have the result that F is 108, FSR is 40 nm, and D is 30 $\mu$m from the equation (FSR=FWHM×F) assuming R is 0.97. In addition, we have the result that F is 155, FSR is 0.37 nm, and D is 20.8 $\mu$m from the equation (FSR=FWHM×F) assuming R is 0.98. It is observed that the reflectance tolerance can be compensated by adjusting the measurement of D so that the FWHM value remains constant. However, during the manufacturing process, the glass substrate 21 and the silicon substrate 22 are fixed together, meaning that the distance D between the two reflecting surfaces in the Fabry-Perot resonant cavity 20 stays fixed. In this case, the prior Fabry-Perot resonant cavity is incapable of compensating the FWHM error caused by the tolerance of the optical coatings, consequently, the prior Fabry-Perot resonant cavity fails to meet the designer's requirements.

To solve the above issue, the designer of the present invention proposes a Fabry-Perot device that fulfills the expected FWHM value so that the Fabry-Perot device may be applied in a effective manner in the fiber optical communication.

SUMMARY OF THE INVENTION

Therefore, an object of the invention is to provide a Fabry-Perot device and the manufacturing method thereof; the Fabry-Perot device is capable of compensating for an error caused by the optical coating tolerance on the FWHM value in a light wave distribution.

Another object of the invention is to provide a method for compensating an FWHM error, accomplished by adjusting a distance between two reflecting surfaces of a Fabry-Perot device.

The Fabry-Perot device of the invention has a Fabry-Perot resonant cavity for allowing a light to pass through; and the Fabry-Perot resonant cavity includes a first reflecting surface with a first reflectance for partly reflecting the light, and a second reflecting surface with a second reflectance configured to be parallel to the first reflecting surface for partly reflecting the light. A distance between the first reflecting surface and the second reflecting surface may be adjusted according to the first and second reflectance in order to compensate an FWHM error of the light caused by the first and second reflectance after the light passes through the Fabry-Perot resonant cavity. The first reflecting surface is situated on a micro reflecting mirror made by MEMS techniques and coated with a first optical thin film, which provides the first reflectance of the first reflecting surface. The first reflecting surface has a tunable gap far smaller than the optical thickness of the resonant cavity.

In the first embodiment of the invention, the second reflecting surface is a surface of a graded-index (GRIN) lens coated with a second optical thin film, which provides the second reflectance. Also, the micro reflecting mirror where the first reflecting surface is situated is connected by solder to the GRIN lens where the second reflecting surface is situated. To be more precise, between the first and second reflecting surfaces stands an adjustable space before connecting and a tunable gap after connecting. Therefore, in accordance with the invention, the adjustable distance between the two reflecting surfaces of the Fabry-Perot device is actually the adjustable space pluses the tunable gap. By adjusting the adjustable distance, the Fabry-Perot device of the invention is able to compensate an FWHM error of a light wave distribution caused by the first and second reflectance after passing through the Fabry-Perot device.

In the second embodiment of the invention, the second reflecting surface is a surface of a glass substrate coated with a second optical thin film, which provides the second reflectance, and the glass substrate is also fixed to a GRIN lens. Also, a solder connects between the micro reflecting mirror and the GRIN lens. Other than this, the rest part of the embodiment is similar to that in the first described embodiment and shall not be repeated.

In the third embodiment of the invention, a Fabry-Perot device further comprises a GRIN lens used as a receiver for receiving a light passed through the Fabry-Perot device. Other than this, the rest part of the Fabry-Perot device in the embodiment is identical to that in the first or the second described embodiment of the invention.

In the fourth embodiment of the invention, the Fabry-Perot device further comprises a reflecting mirror or a reflecting prism for reflecting the light passed through the Fabry-Perot device back to the Fabry-Perot device. Other than this, the rest embodiment of the Fabry-Perot device is identical to that in the first or the second described embodiment of the invention.

DESCRIPTION OF THE PREFERRED EMBODIMENTS

To solve the issue of the conventional Fabry-Perot resonant cavity failing to meet the expected FWHM value, the invention provides a Fabry-Perot device. A parallel light input device whose surface is coated with an optical thin film, a GRIN lens for example, is used as a first reflecting surface, and a reflecting surface formed by MEMS techniques is used as a second reflecting surface. In this manner, the distance between the first reflecting surface and the second reflecting surface in the Fabry-Perot of the invention remains adjustable instead of fixed. Hence, the distance between the two reflecting surfaces may be adjusted according to reflectance of the optical thin films coated on the first reflecting surface situated on the GRIN lens and the second reflecting surface formed by MEMS techniques, thereby enabling the manufactured Fabry-Perot device to realize an expected FWHM value. The embodiments of the invention are illustrated below with referring to FIGS. 4A to 5B.

First Embodiment

Figure 1:
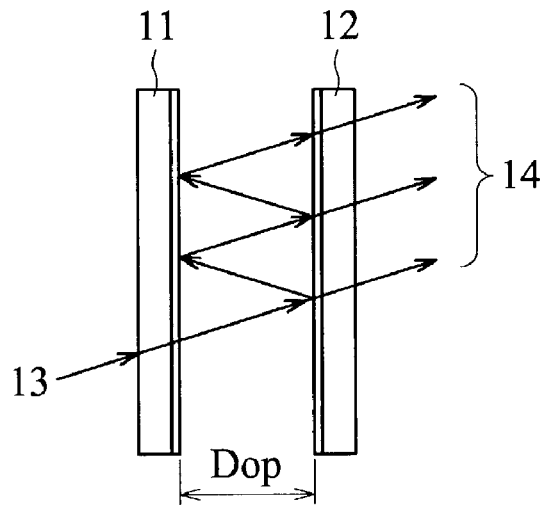
FIG. 1 is a schematic diagram showing a prior Fabry-Perot Etalon.
Figure 2:
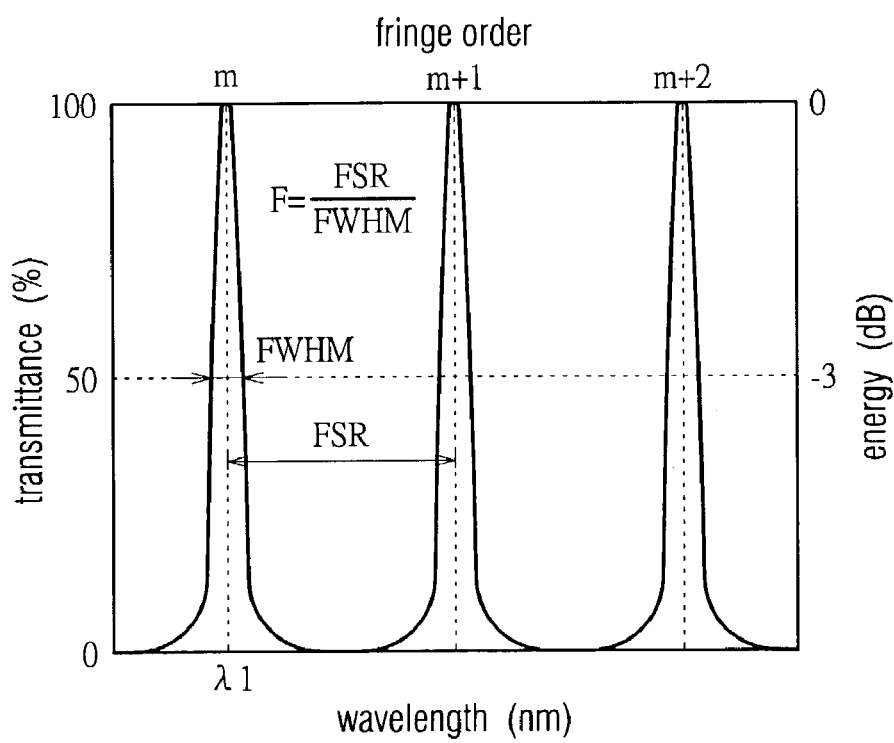
FIG. 2 is a schematic diagram showing the spectrum characteristics of a light wave. Herein, the upper horizontal axis represents the fringe order, the lower horizontal axis represents the wavelength, the right vertical axis represents the energy loss (in dB), and the left vertical axis represents the percent transmittance (in %).
Figure 3:
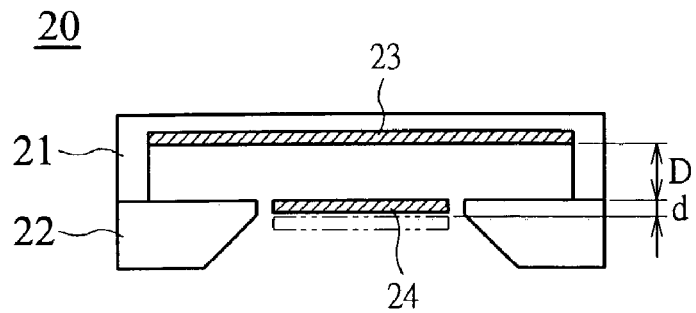
FIG. 3 is a sectional schematic diagram showing a prior Fabry-Perot device manufactured by semiconductor and MEMS manufacturing techniques.
Figure 4A:
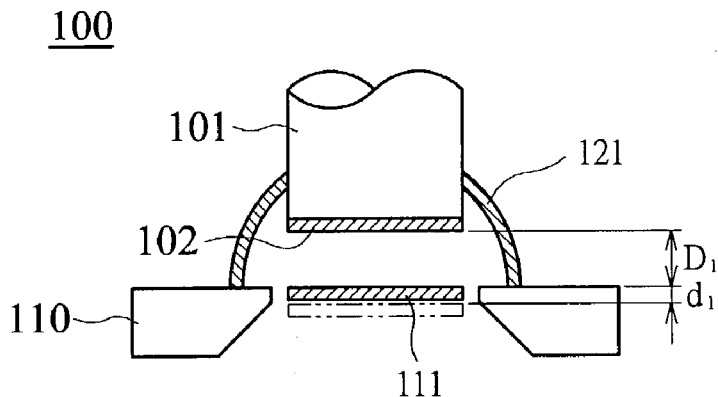
FIG. 4A is a sectional schematic diagram showing the Fabry-Perot device according to the first embodiment of the invention.

FIG. 4A is the sectional schematic diagram showing the Fabry-Perot device 100 in the first embodiment of the invention. Referring to FIG. 4A, the Fabry-Perot device 100 of the embodiment mainly includes a GRIN lens 101 coated with an optical thin film 102 functioning as a first reflecting surface, and a micro reflecting mirror 110 formed by MEMS techniques and coated with another optical thin film 111 functioning as the second reflecting surface; and the GRIN lens 101 and the micro reflecting mirror 110 are connected by the solder 121. In the manufacturing process of the Fabry-Perot device in the embodiment, the above first reflecting surface and the second reflecting surface are configured to be parallel with a space $D_1$ (in μm), and the second reflecting surface of the micro reflecting mirror 110 has a tunable gap $d_1$ (in μm); $d_1$ is comparatively small to $D_1$, that is, $d_1 << D_1$. In this regard, space $D_1$ is adjustable before connecting by the solder 121. Therefore, the space $D_1$ in the Fabry-Perot device of the invention may be nevertheless adjusted according to the actual reflectance of the optical thin films 111 and 102, although the actual reflectance of the optical thin films 111 and 102 have tolerance rather than achieve the designer's expected reflectance. Thus, the Fabry-Perot device of the invention may realize an expected FWHM value after the connection done by the solder 121. Take the above description for example, when the expected reflectance R is 0.97 and the actual reflectance R is 0.96, the space $D_1$ is adjusted to be about 28 μm (where R is 0.98) from the previously specified 30 μm (where R is 0.97).

In addition, after the connection done by the solder 121 in the Fabry-Perot device of the invention, because the second reflecting surface of the micro reflecting mirror 110 functions as a mobile reflecting surface, the tunable gap $d_1$ may then be employed to adjust the filtering effect of light waves. However, it is noted that the gap $d_1$ is comparatively small to the space $D_1$. Hence, the adjustable space $D_1$ and the tunable gap $d_1$ are entirely different in the Fabry-Perot device of the invention. To be more explicit, the adjustable distance between the two reflecting surfaces of the Fabry-Perot device of the invention, is practically $D_1$ pluses $d_1$.

Second Embodiment

Figure 4B:
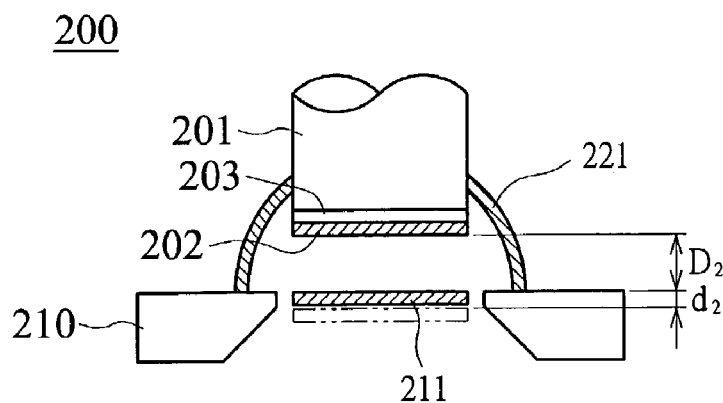
FIG. 4B is a sectional schematic diagram showing the Fabry-Perot device according to the second embodiment of the invention.

Referring to FIG. 4B, the Fabry-Perot device 200 in the second embodiment of the invention mainly includes a GRIN lens 201 on which a glass substrate 203 is provided, and the glass substrate 203 is coated with an optical thin film 202 functioning as a first reflecting surface; and a micro reflecting mirror 210 formed by MEMS techniques is coated with an optical thin film 211 functioning as a second reflecting surface. In addition, the GRIN lens 201 and the micro reflecting mirror 210 are connected by the solder 221. In process of manufacturing the Fabry-Perot device of the invention, the first and second reflecting surfaces are configured to be parallel with a space $D_2$, and the second reflecting surface of the micro reflecting mirror 210 is manufactured to have a tunable gap $d_2$. Herein, $d_2$ is comparatively small to $D_2$, that is, $d_2 << D_2$. With respect to the above, the space $D_2$ is adjustable before connecting by the solder 221. Therefore, the space $D_2$ may be nevertheless adjusted according to the actual reflectance of the optical thin films 211 and 202, although tolerance indeed exists in the actual reflectance of the optical thin films 211 and 202. Thereby, the Fabry-Perot device of the invention may realize an expected FWHM value after the connection done by the solder 221.

In addition, after the connection done by the solder 221 in the Fabry-Perot device of the invention, because the second reflecting surface of the micro reflecting mirror 210 functions as a mobile reflecting surface, the tunable gap $d_2$ may then be adjusted to modulate the filtering effect of light waves. However, one should notice that the gap $d_2$ is comparatively small to the space $D_2$, thus in the Fabry-Perot device of the invention, the degree of the adjustable space $D_2$ and the tunable gap $d_2$ are entirely different values. To be more explicit, the adjustable distance between the two reflecting surfaces of the Fabry-Perot device of the invention, is practically $D_2$ pluses $d_2$.

Third Embodiment

Figure 5A:
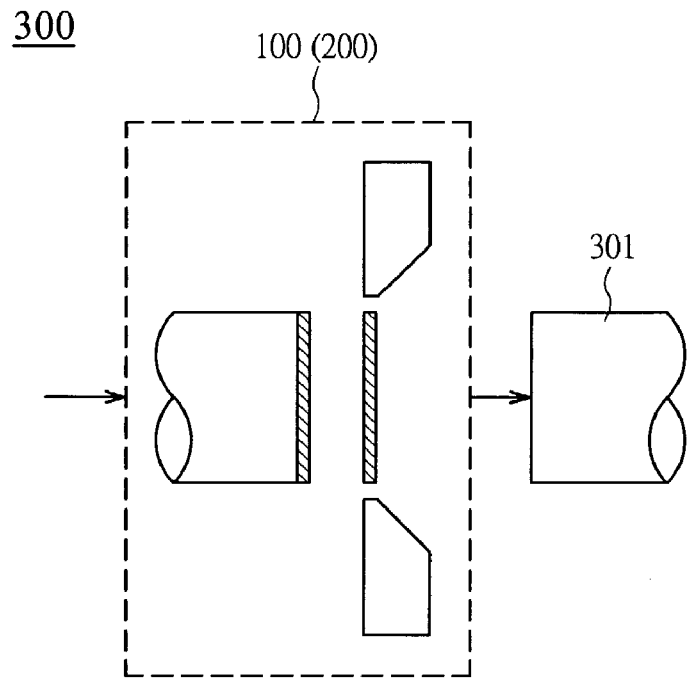
FIG. 5A is a sectional schematic diagram showing the Fabry-Perot device according to the third embodiment of the invention.

The Fabry-Perot device 100 in the above embodiment may further include an additional GRIN lens 301 or a photodiode (not shown) to become the Fabry-Perot device 300 as shown in FIG. 5A. In this case, the GRIN lens 301 included in the embodiment is employed as a receiver for receiving light waves passed through the Fabry-Perot device 100. Other than this, the rest part of the Fabry-Perot device 300 in the embodiment is identical to that in the first embodiment and shall not be further described.

Similarly, the Fabry-Perot device 300 in the embodiment may also be composed of the Fabry-Perot device 200 in the second embodiment and a additional GRIN lens. Other than this, the rest part of the Fabry-Perot device 300 is identical to that in the second embodiment.

Fourth Embodiment

Figure 5B:
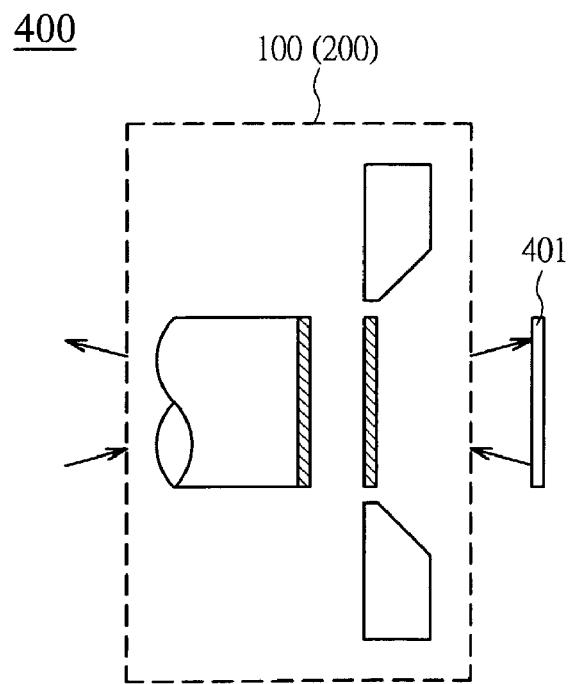
FIG. 5B is a sectional schematic diagram showing the Fabry-Perot device according to the fourth embodiment of the invention.

Moreover, as shown in FIG. 5B, when the above GRIN lens 101/201 in the first/second embodiment is dual fiber, the Fabry-Perot device 101/201 in the first/second embodiment may further include an additional reflector 401, a reflecting mirror or a reflecting prism for instance, to become a Fabry-Perot device 400 as shown in FIG. 5B. In this case, the reflector 401 included in the embodiment reflects the light waves passed through the Fabry-Perot device 100/200 back to the same Fabry-Perot device. Other than this, the rest part of the Fabry-Perot device 400 in the embodiment is identical to that in the first/second embodiment and shall not be further described.

Summing up, the embodiments of the invention have been clearly described as above. However; for those who are skilled with the techniques, it is to be understood that the described examples are only illustrative but not limitative. That is, without departing from the true spirit and scope of the invention, variations and modifications made based upon the above devices shall be embraced within the appended claims.

What is claimed is:

1. A Fabry-Perot device with a Fabry-Perot resonant cavity for a light to pass through, the Fabry-Perot resonant cavity comprising:

a first reflecting surface with a first reflectance for partly reflecting the light; and a second reflecting surface with a second reflectance provided parallel to the first reflecting surface for partly reflecting the light;

wherein a distance between the first reflecting surface and the second reflecting surface is adjusted during operation after monitoring a spectrum of the light passed through the Fabry-Perot device to compensate for an error of full-width-at-half-maximum.

2. The Fabry-Perot device as described in claim 1, wherein the first reflecting surface comprises a first optical thin film on a mobile micro mirror so as to provide the first reflectance.

3. The Fabry-Perot device as described in claim 2, wherein the first reflecting surface has a tunable gap.

4. The Fabry-Perot device as described in claim 1, wherein the second reflecting surface is a surface of a graded-index lens, the surface of the graded-index lens being coated with a second optical thin film that provides the second reflectance.

5. The Fabry-Perot device as described in claim 1, wherein the second reflecting surface is a surface of a glass substrate, the surface of the glass substrate being coated with a second optical thin film that provides the second reflectance, and the glass substrate being fixed on a graded-index lens.

6. The Fabry-Perot device as described in claim 1 further including a receiver for receiving the light passed through the Fabry-Perot resonant cavity.

7. The Fabry-Perot device as described in claim 6, wherein the receiver is a graded-index lens.

8. The Fabry-Perot device as described in claim 6, wherein the receiver is a photodiode.

9. The Fabry-Perot device as described in claim 1 further including a reflector for reflecting the light passed through the Fabry-Perot resonant cavity back to the Fabry-Perot resonant cavity.

10. The Fabry-Perot device as described in claim 9, wherein the reflector is a reflecting prism.

11. A method of making a Fabry-Perot device compensating for an error of full-width-at-half-maximum comprising the following steps:
coating a first optical thin film on a mobile micro mirror to form a first reflecting surface;
coating a second optical thin film on a graded-index lens to form a second reflecting surface;
configuring the first reflecting surface and the second reflecting surface to be parallel; and
monitoring the spectrum of a light passed through the Fabry-Perot device, and adjusting a distance between the first reflecting surface and the second reflecting surface to make the error of full-width-at-half-maximum limited to the tolerance.

12. The method of making a Fabry-Perot device compensating for an error of full width at half maximum as described in claim 11 further comprising the step of fixing the mobile micro reflecting mirror and the graded-index lens with a solder after making the error of full-width-at-half-maximum limited to the tolerance.

13. The method of making a Fabry-Perot device compensating for an error of full-width-at-half-maximum as described in claim 11, wherein the first reflecting surface has a tunable gap.

14. The Fabry-Perot device as described in claim 9, wherein the reflector is a reflecting mirror.

* * * * *